(12) United States Patent
Wee et al.

(10) Patent No.: US 11,523,266 B2
(45) Date of Patent: *Dec. 6, 2022

(54) WIRELESS COMMUNICATION APPARATUS AND WIRELESS COMMUNICATION METHOD

(71) Applicant: Panasonic Intellectual Property Corporation of America, Torrance, CA (US)

(72) Inventors: Yao Huang Gaius Wee, Singapore (SG); Michael Hong Cheng Sim, Singapore (SG); Masataka Irie, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/001,961

(22) Filed: Aug. 25, 2020

(65) Prior Publication Data

US 2020/0396585 A1    Dec. 17, 2020

Related U.S. Application Data

(63) Continuation of application No. 16/125,007, filed on Sep. 7, 2018, now Pat. No. 10,791,453, which is a
(Continued)

(30) Foreign Application Priority Data

Mar. 1, 2017    (JP) .................................. 2017-038599

(51) Int. Cl.
*H04W 8/00* (2009.01)
*H04B 7/0491* (2017.01)
(Continued)

(52) U.S. Cl.
CPC .......... *H04W 8/005* (2013.01); *H04B 7/0491* (2013.01); *H04B 7/06* (2013.01);
(Continued)

(58) Field of Classification Search
CPC ........ H04B 7/088; H04B 7/06; H04B 7/0491; H04B 7/0695; H04W 48/08; H04W 8/005;
(Continued)

(56) References Cited

U.S. PATENT DOCUMENTS 9,119,022 B2    8/2015  Sinha
10,555,170 B2   2/2020  Sun et al.
(Continued)

FOREIGN PATENT DOCUMENTS

JP    2011-514107 A        4/2011
KR    10-2015-0115931 A    10/2015
(Continued)

OTHER PUBLICATIONS

Indian Examination Report dated Sep. 21, 2021 for the related Indian Patent Application No. 201847033480.
(Continued)

*Primary Examiner* — Brian D Nguyen
(74) *Attorney, Agent, or Firm* — Seed IP Law Group LLP

(57) ABSTRACT

A wireless communication apparatus comprising: a frame configuration circuit that generates a transmission frame including DMG beacons, wherein sector ID fields in SSW fields included in the respective DMG beacons indicate one or more transmit sectors used for directional transmissions of the respective DMG beacons, and a field different from the sector ID field included in each DMG beacon indicates whether or not there is quasi-omni transmission; and a transmission wireless circuit that performs, by using the transmit sector indicated by the sector ID field, directional
(Continued)

transmission on a first DMG beacon that is included in the DMG beacons and in which the field different from the sector ID field indicates non-quasi-omni transmission and performs quasi-omni transmission on a second DMG beacon that is included in the DMG beacons and in which the different field indicates quasi-omni transmission, in a BTI.

8 Claims, 9 Drawing Sheets

Related U.S. Application Data continuation of application No. PCT/JP2017/008879, filed on Mar. 7, 2017.

(60) Provisional application No. 62/307,281, filed on Mar. 11, 2016.

(51) Int. Cl.
| | |
|---|---|
| *H04B 7/06* | (2006.01) |
| *H04L 1/16* | (2006.01) |
| *H04W 48/08* | (2009.01) |
| *H04W 84/12* | (2009.01) |
| *H04W 16/28* | (2009.01) |
| *H04W 48/16* | (2009.01) |

(52) U.S. Cl.
CPC ......... *H04B 7/0695* (2013.01); *H04L 1/1657* (2013.01); *H04W 48/08* (2013.01); *H04W 16/28* (2013.01); *H04W 48/16* (2013.01); *H04W 84/12* (2013.01)

(58) Field of Classification Search
CPC ..... H04W 16/28; H04W 84/12; H04W 48/16; H04L 1/1657
See application file for complete search history.

(56) References Cited

U.S. PATENT DOCUMENTS

| | | |
|---|---|---|
| 2009/0097533 A1 | 4/2009 | Lakkis |
| 2009/0204874 A9 | 8/2009 | Lakkis |
| 2009/0232035 A1 | 9/2009 | Cordeiro et al. |
| 2011/0075642 A1 | 3/2011 | Cordeiro et al. |
| 2011/0205969 A1 | 8/2011 | Ahmad et al. |
| 2015/0289147 A1 | 10/2015 | Lou et al. |
| 2015/0319700 A1 | 11/2015 | Oteri et al. |
| 2015/0382171 A1 | 12/2015 | Roy et al. |
| 2016/0044711 A1* | 2/2016 | Lou ................... H04W 74/0816 370/338 |
| 2016/0255660 A1* | 9/2016 | Son ....................... H04B 7/0619 370/329 |
| 2017/0338935 A1 | 11/2017 | Ahn et al. |
| 2018/0049240 A1 | 2/2018 | Kim et al. |
| 2018/0206139 A1* | 7/2018 | Wang .................... H04B 7/2606 |
| 2020/0160614 A1* | 5/2020 | Chen .................... G06F 3/04815 |

FOREIGN PATENT DOCUMENTS

| | | |
|---|---|---|
| WO | 2014/124237 A1 | 8/2014 |
| WO | 2014/151951 A1 | 9/2014 |
| WO | 2015/069090 A1 | 5/2015 |

OTHER PUBLICATIONS

Communication pursuant to Article 94(3) EPC, dated Jun. 25, 2020, for the related European Patent Application No. 17763198.3, 10 pages.
Extended European Search Report, dated May 2, 2019, for the related European Patent Application No. 17763198.3.
IEEE Std 802.11ad(TM)—2012 IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012 (See "10.1 Synchronization, pp. 329-341").
International Search Report of PCT Application No. PCT/JP2017/008879, dated Jun. 6, 2017.
Panasonic, "Fas BSS Discovery," IEEE, vol. 802.11-16/1571r0, Jan. 4, 2017, 22 pages.
Thomas Nitsche et al., "IEEE 802.11ad: Directional 60 GHz Communication for Multi-Gigabit-per-Second Wi-Fi", IEEE Communications Magazine, vol. 52, 12, Dec. 11, 2014, pp. 132-141.

* cited by examiner

WIRELESS COMMUNICATION APPARATUS AND WIRELESS COMMUNICATION METHOD

This application is a continuation of U.S. patent application Ser. No. 16/125,007, filed Sep. 7, 2018, now U.S. Pat. No. 10,791,453 B2, which is a continuation of International Application No. PCT/JP2017/008879, filed Mar. 7, 2017, which claims the priority benefit of Japanese Patent Application No. 2017-038599, filed Mar. 1, 2017, and claims the benefit of U.S. Provisional Patent Application No. 62/307,281, filed Mar. 11, 2016.

BACKGROUND

1. Technical Field

The present disclosure relates to a wireless communication apparatus and a wireless communication method.

2. Description of the Related Art

In IEEE 802.11ad, a wireless communication apparatus that performs wireless communication by using a millimeter waveband uses a beacon transmission interval (BTI), as described below, in a device discovery procedure using directional multi-gigabit (DMG) beacons.

(1) A station (which may hereinafter be referred to as a "DMG-STA" or "STA") supporting DMG receives DMG beacons in a BTI of an access point (AP)/personal basic service set central point (PCP, which may hereinafter be referred to as a "DMG-AP/PCP" or "AP/PCP") supporting DMG.

(2) In a BTI of the DMG-STA, the DMG-STA transmits a DMG beacon (which may hereinafter be referred to as a "discovery DMG beacon") in which a discovery mode field is set to 1.

(3) Considering the directivity in the DMG, the BTI is constituted by one or more (a maximum of 128) DMG beacons transmitted as a transmit sector sweep.

(4) In order to reduce overhead, some fields including fields (for example, for a service set identifier (SSID) and a DMG capability) required for discovery are omitted from DMG beacons.

Related art is disclosed in IEEE 802.11Ad™-2012, pp. 329 to 341, 10.1 Synchronization.

SUMMARY

However, in communication using known millimeter wavebands, high-speed discovery (200 ms or less) has not been fully considered for discovery using DMG beacons, when the number of STAs to be discovered increases.

One non-limiting and exemplary embodiment provides a wireless communication apparatus that can realize high-speed discovery (200 ms or less), even when the number of STAs that are to be discovered in discovery using DMG beacons increases.

In one general aspect, the techniques disclosed here feature a wireless communication apparatus including: a frame configuration circuit that generates a transmission frame including directional multi-gigabit (DMG) beacons, wherein sector identifier fields in sector sweep fields included in the respective DMG beacons indicate one or more transmit sectors used for directional transmissions of the respective DMG beacons, and a field different from the sector identifier field included in each of the DMG beacons indicates whether or not there is quasi-omni transmission; and a transmission wireless circuit that performs, by using the transmit sector indicated by the sector identifier field, directional transmission on a first DMG beacon that is included in the DMG beacons and in which the field different from the sector identifier field indicates non-quasi-omni transmission and that performs quasi-omni transmission on a second DMG beacon that is included in the DMG beacons and in which the field different from the sector identifier field indicates quasi-omni transmission, in a beacon transmission interval.

According to one aspect of the present disclosure, high-speed discovery (200 ms or less) can be realized even when STAs that are to be discovered in discovery using DMG beacons increase.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

High-speed discovery (200 ms or less) is desirable in many applications. Thus, in order to achieve high-speed discovery, passive (static) scanning is not ideal.

In an AP/PCP, overhead increases when the frequency of a transmit sector sweep in which discovery information is included is increased.

Thus, in active (dynamic) scanning, since beamforming is performed before a probe response is obtained, the discovery time increases.

Figure 1:
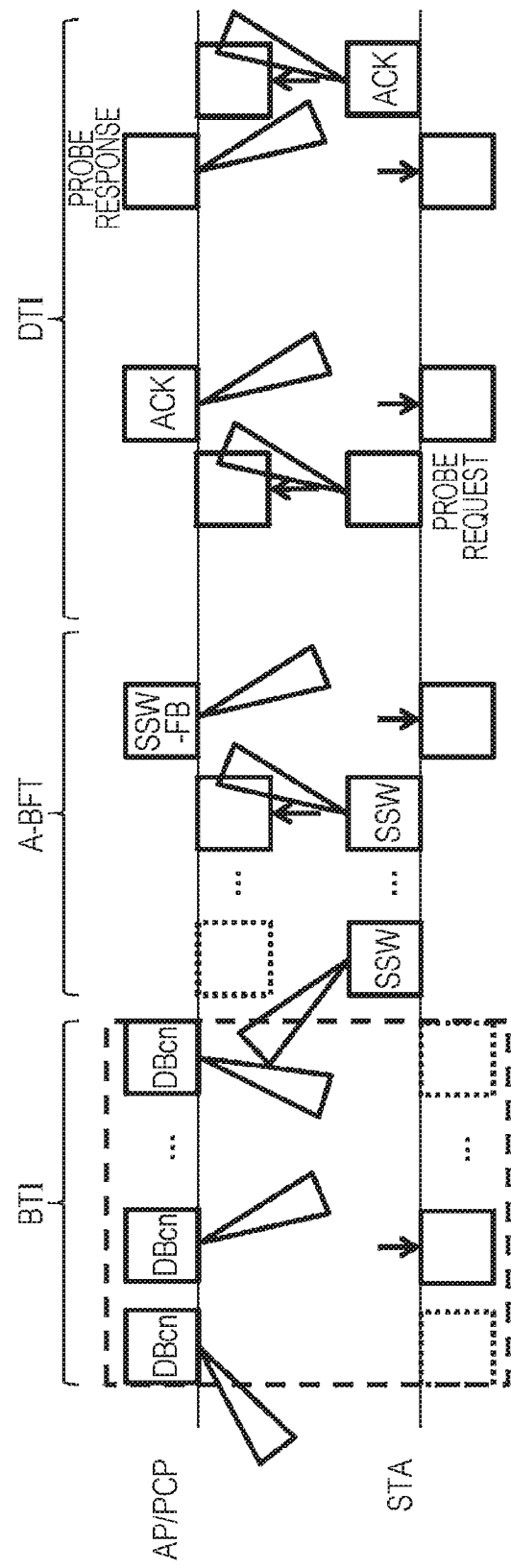
FIG. 1 is a diagram illustrating one example of a device discovery procedure using DMG beacons via directional transmission according to the present disclosure.

FIG. 1 is a diagram illustrating one example of a device discovery procedure using DMG beacons via directional transmission.

In FIG. 1, a STA executes beamforming (association beamforming training (A-BFT)). This is because a BTI does not include discovery information. The A-BFT may be omitted.

This is because overhead is added (at least 99.1 µs/BI) when the A-BFT is frequently executed. Thus, when some devices (a STA and an AP/PCP) use the A-BFT, a collision rate increases, consequently causing further delay.

Figure 3:
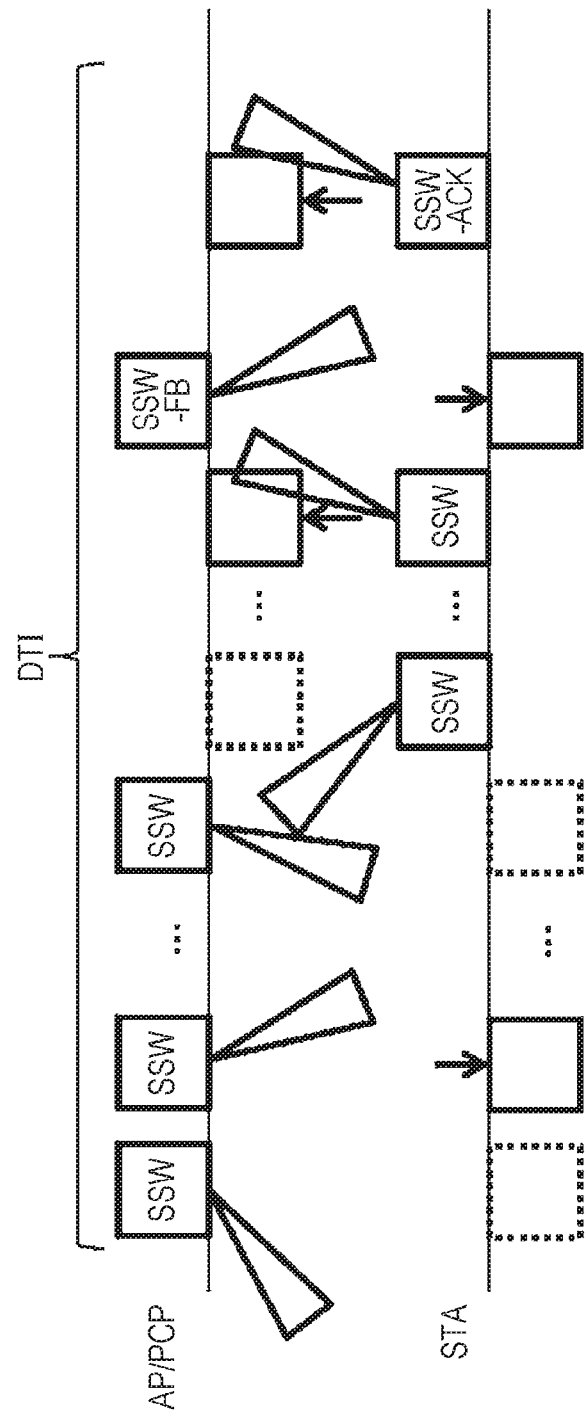
FIG. 3 is a diagram illustrating an SLS in a DTI.

FIG. 3 is a diagram illustrating a sector level sweep (SLS) in a data transfer interval (DTI). In this case, in FIG. 3, the SLS is executed in the DTI. Although a STA can obtain discovery information via the SLS in FIG. 3, it takes at least a few milliseconds.

Figure 2:
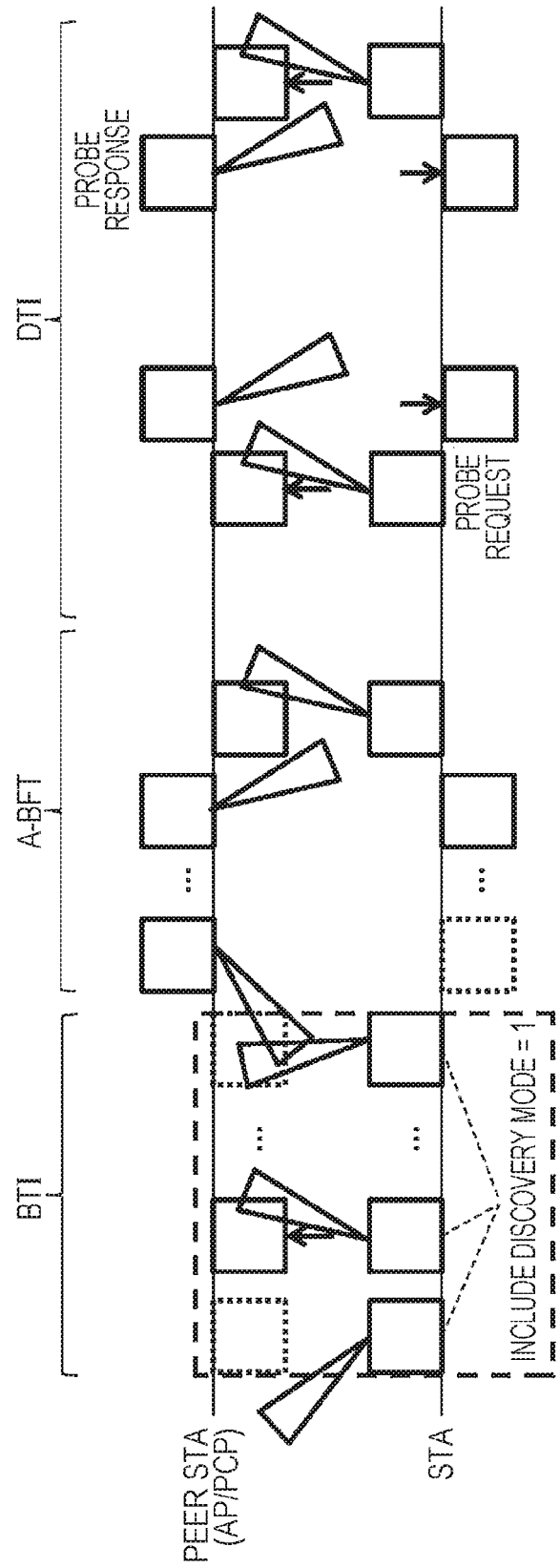
FIG. 2 is a diagram illustrating another example of the device discovery procedure using DMG beacons via directional transmission according to the present disclosure.

FIG. 2 is a diagram illustrating another example of the device discovery procedure using DMG beacons via directional transmission.

In FIG. 2, since a STA sets a discovery mode to 1 in a BTI, the STA predicts a response from a peer STA in an A-BFT; however, there are cases in which, for example, in an assigned time, collision with another STA occurs, which makes it difficult for the peer STA (AP/PCP) to use the A-BFT.

Also, the possibility that the AP/PCP gives priority to operating as a base-station apparatus is high, and there are cases in which beamforming by the STA is delayed. Thus, when a plurality of devices (STAs) attempts to use the A-BFT, the collision rate increases, consequently causing further delay.

The STA does not recognize the AP/PCP until the AP/PCP starts beamforming.

In this case, it is difficult to achieve complete omni (omnidirectional) transmission in DMG, and it is also difficult for quasi-omni transmission to cover a sufficient range of directional transmission. The quasi-omni transmission is beam transmission to a part of an area of omni-transmission and means transmission to a wider area than that of directional transmission in which transmission is performed to one transmit sector, that is, transmission to a plurality of transmit sectors.

First Embodiment

Figure 4:
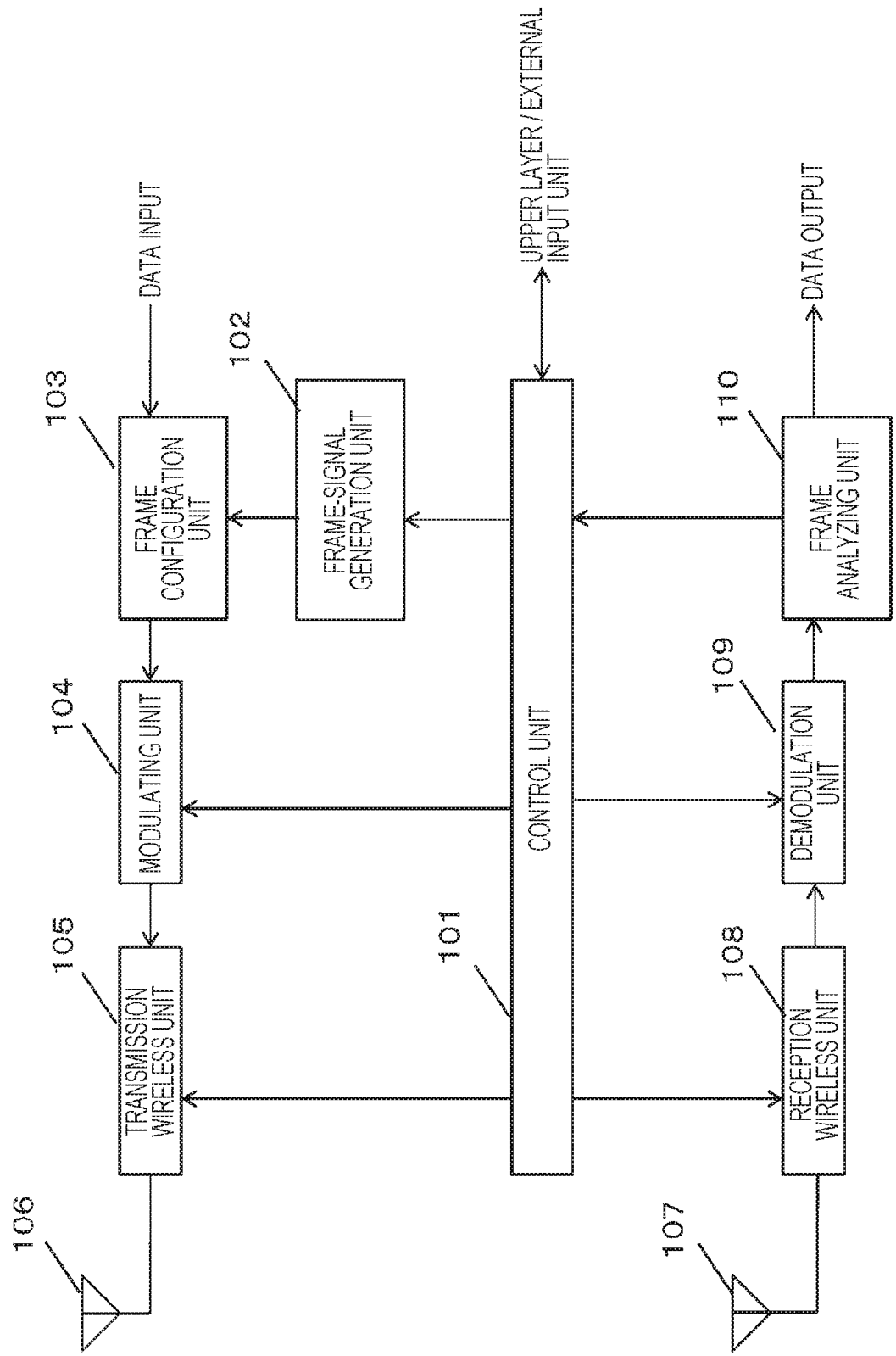
FIG. 4 is a diagram illustrating a configuration of an AP/PCP or a STA according to a first embodiment of the present disclosure.

FIG. 4 is a diagram illustrating a configuration of an AP/PCP or a STA (wireless communication apparatus).

The AP/PCP or STA includes a control unit 101, a frame-signal generation unit 102, a frame configuration unit 103, a modulating unit 104, a transmission wireless unit 105, a transmission antenna unit 106, a reception antenna unit 107, a reception wireless unit 108, a demodulation unit 109, and a frame analyzing unit 110.

The control unit 101 issues, to the frame-signal generation unit 102, an instruction for the configuration of a frame to be transmitted and controls the transmission wireless unit 105 in accordance with a transmission frame to cause the transmission antenna unit 106 and the reception antenna unit 107 to execute directional transmission and quasi-omni transmission. The control unit 101 also controls the reception wireless unit 108 and the demodulation unit 109 to execute reception processing. The control unit 101 reports discovery information to an upper layer, not illustrated, and a connection command based on the reporting is input. The connection command may be a determination at the upper layer or may be a decision by a user. The decision by the user is input from an external input unit, not illustrated.

In accordance with an instruction from the control unit 101, the frame-signal generation unit 102 generates frame configuration signals that are used for a transmission frame.

The frame configuration unit 103 generates the transmission frame by using the frame configuration signals and data.

In accordance with an instruction from the control unit 101, the modulating unit 104 generates modulated signals, for example, by using a modulation system, such as QPSK, for the transmission frame.

In order to perform directional transmission or quasi-omni transmission from the transmission antenna unit 106 to an arbitrary transmit sector, the transmission wireless unit 105 performs phase adjustment on the modulated signals and performs frequency conversion on the phase-adjusted modulated signals to convert the modulated signals into wireless signals.

The transmission antenna unit 106 transmits the wireless signals via directional transmission or quasi-omni transmission.

By performing directional reception or quasi-omni reception in an arbitrary receive sector, the reception antenna unit 107 receives wireless signals transmitted via directional transmission or quasi-omni transmission. In accordance with an instruction from the control unit 101, the reception wireless unit 108 performs frequency conversion to convert the received wireless signals into baseband signals.

In accordance with an instruction from the control unit 101, the demodulation unit 109 demodulates the baseband signals and outputs a transmission frame.

The frame analyzing unit 110 analyzes the frame configuration signals included in the transmission frame and outputs discovery information (a probe request, a probe response, and a discovery DMG beacon (DBcn)) to the control unit 101.

Figure 5:
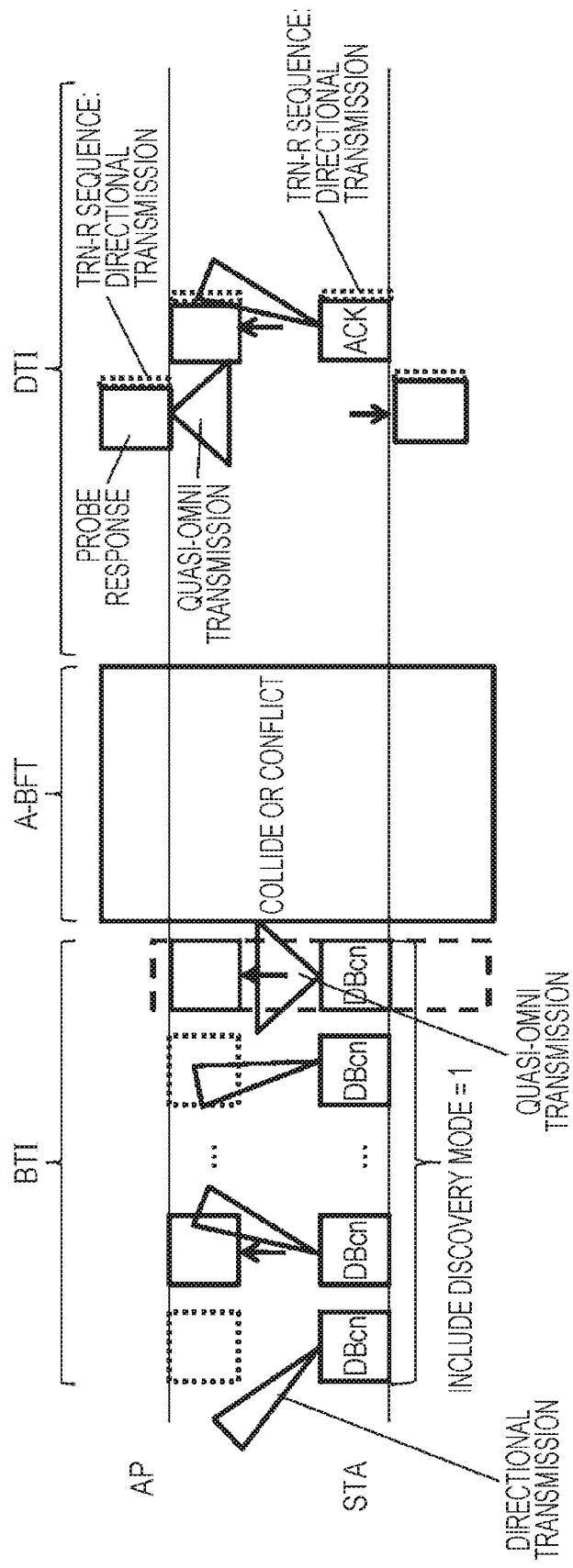
FIG. 5 is a diagram illustrating one example of a device discovery procedure using DMG beacons via quasi-omni transmission according to the first embodiment of the present disclosure.

FIG. 5 is a diagram illustrating one example of a device discovery procedure using DMG beacons via quasi-omni transmission.

A STA that executes device discovery includes quasi-omni transmission of a DMG beacon in a BTI. A DMG beacon (DBcn) indicates that, for example, the STA is used for discovery when a discovery mode field is set to 1. One bit of each DMG beacon is used to indicate whether or not one or more quasi-omni transmissions are included in the BTI.

The DMG beacon on which the STA performs quasi-omni transmission is transmitted by a control modulation and coding scheme (MCS). For example, the control MCS may be MCS 0 specified by 11ad. In the quasi-omni transmission, use of MCS 0 can increase a transmission area to a maximum degree.

Figure 6:
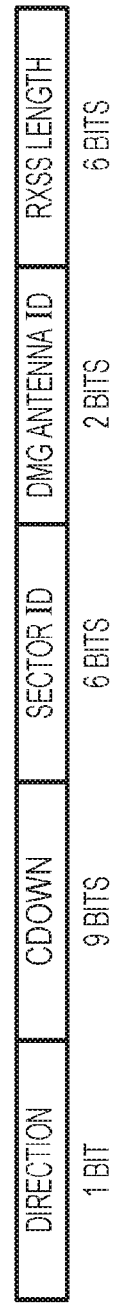
FIG. 6 is a diagram illustrating one example of a format of an SSW field (DMG beacon: DBcn) according to the first embodiment of the present disclosure.

FIG. 6 is a diagram illustrating one example of a format of an SSW field. For example, 2 bits in a receive sector sweep (RXSS) length field, which is reserved in a BTI, are used to indicate whether or not one or more quasi-omni transmissions are included in the BTI. An SSW field can also be used as one constituent element of a DMG beacon in a BTI and can also be used as one constituent element of an SSW frame in an A-BFT.

In FIG. 5, the STA transmits a quasi-omni transmission DMG beacon at least by the end of the BTI to (implicitly or explicitly) request a probe response from an AP.

After the AP receives DMG beacons via a plurality of directional transmissions and one or more quasi-omni transmissions, A-BFT beamforming to the STA is not completed, for example, owing to collision with another device or conflict with a schedule of the AP.

The collision refers to a state that occurs when a plurality of peer STAs (e.g. APs) accesses the STA at once in a limited time. Also, the conflict refers to a state that occurs when the STA that does not know a schedule performs beamforming training at an arbitrary time, although there is a schedule (an order of STAs that transmit SLS) specified by an AP.

Next, in a DTI, the AP transmits a probe response via (for example, one) quasi-omni transmission to which a receive-training (TRN-R) sequence for executing mutual antenna training is attached. The TRN-R sequence may be swept in a range of quasi-omni transmission as directional transmission.

Upon receiving the probe response, the STA may further respond by directionally transmitting an ACK (acknowledge) to which the TRN-R sequence is attached. The STA identifies a best receive sector from reception of the TRN-R sequence, stores the best receive sector, identifies a best transmit sector from the best receive sector based on an antenna reciprocity, and stores the best transmit sector.

When the determination is successfully made in time, the STA sends an ACK by using the best transmit sector; otherwise, the STA sends an ACK as quasi-omni transmission.

The AP receives the ACK, identifies a best receive sector from the reception of the TRN-R sequence, and stores the best receive sector. The AP identifies a best transmit sector from the best receive sector, based on an antenna reciprocity, and stores the best transmit sector.

As a result of the foregoing, the STA can use a DMG beacon frame for quasi-omni transmission included in a (DMG beacon) transmit sector sweep (TXSS) in the BTI.

A TRN sequence that is directionally transmitted for mutual antenna training may be attached to quasi-omni transmission of a DMG beacon in the DTI.

A probe response from a peer device (peer STA) can requested via quasi-omni transmission of a DMG beacon.

Also, the quasi-omni transmission of the DMG beacon can indicate that the STA performs quasi-omni transmission.

Also, when the position of the quasi-omni transmission is fixed (example: at the end of the BTI), explicit instruction information (for example, 1 is set for the discovery mode) does not necessarily have to be included.

The quasi-omni transmission of the DMG beacon can indicate the number of quasi-omni transmissions or can indicate that a plurality of quasi-omni transmissions is included in one BTI.

The directional transmission of the DMG beacon can indicate that quasi-omni transmission is included in a BTI/TXSS.

The directional transmission of the DMG beacon can be fragmented (fragmented) across one or more BTIs, and quasi-omni transmission of a DMG beacon may be included in one or more BTIs.

The STA that executes device discovery can transmit DMG beacons in the BTI (see FIG. 5).

When devices (a STA and an AP/PCP) use quasi-omni transmission for one or more DMG beacons (see FIG. 5), it is possible to indicate, for the A-BFT, settings (a length/a frequency/the presence or absence/others) different from those in a case in which directional transmission is used for all DMG beacons (see FIGS. 1 and 2).

In the BTI in FIG. 5, the device (AP) receives one or more DMG beacons transmitted via quasi-omni transmission as a part of a transmit sector sweep (TXSS).

In FIG. 5, when the quasi-omni transmission is received, the device (AP) can transmit a frame (for example, a probe response or an ACK response) before normal beamforming exchange is performed (an SLS in the A-BFT is completed without occurrence of collision or conflict). The frame (the probe response by the AP) to be transmitted can be transmitted via quasi-omni transmission in the control MCS.

When a probe response in the received quasi-omni transmission includes a directional TRN sequence, the STA can directionally transmit a frame (an ACK in the DTI in FIG. 5) to be transmitted.

The frame to be transmitted is a frame for requesting discovery information or a frame including discovery information and is, for example, a probe request, a probe response, or a discovery DMG beacon (DBcn).

In the DTI in FIG. 5, the AP may attach a beam refinement protocol (BRP) frame for requesting/starting beam fine adjustment, instead of the TRN-R sequence, to the frame (the probe response) to be transmitted.

The frame to be transmitted can include beamforming feedback to a peer device, for example, a best transmit sector.

A TRN sequence directionally transmitted for mutual antenna training can be attached to the frame to be transmitted.

When a quasi-omni DMG beacon is not received, the device (STA) may avoid quasi-omni transmission to a peer device (AP) or may avoid discovery of a peer device and connection with a peer device.

As a result of the foregoing, the AP can discover, at high speed, the device (STA) in the range of quasi-omni transmission using the control MCS.

Also, when quasi-omni transmission is included in the BTI, the peer device (AP) can recognize whether or not to execute discovery of a device (STA) and connection with the device (STA).

Also, when the device (STA) includes discovery information in quasi-omni transmission in the BTI, the peer device (AP) can discover the device (STA) with minimum overhead.

Second Embodiment

Although, in the first embodiment, the description has been given of the STA transmitting a DMG beacon via quasi-omni transmission after DMG beacons are transmitted via directional transmission in the BTI, a description in the second embodiment will be given of a STA attaching one or more TRN sequences to each DMG beacon transmission via directional transmission.

Figure 7:
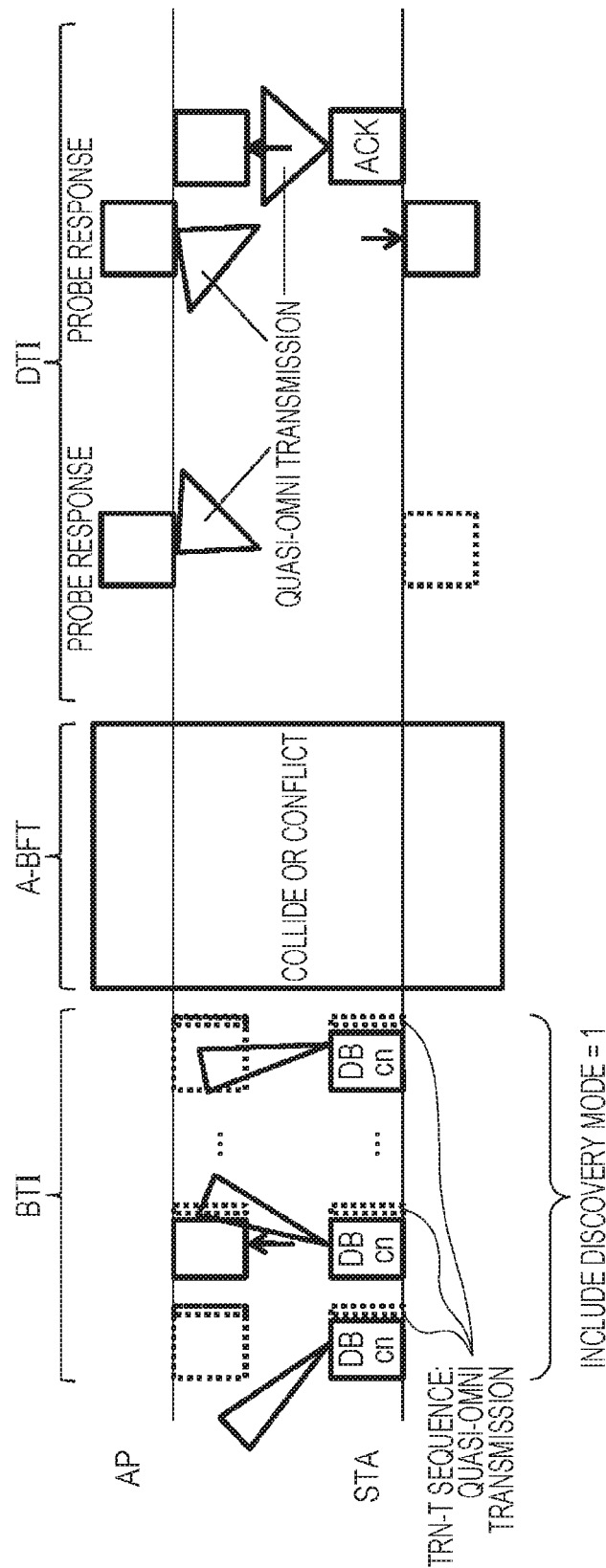
FIG. 7 is a diagram illustrating another example of the device discovery procedure using DMG beacons via quasi-omni transmission according to a second embodiment of the present disclosure.

FIG. 7 is a diagram illustrating another example of the device discovery procedure using DMG beacons via quasi-omni transmissions.

In a BTI in FIG. 7, first, a STA that executes device discovery attaches one or more TRN sequences to each directional-transmission DMG beacon in a BTI and performs quasi-omni transmission on each directional-transmission DMG beacon by using the control MCS.

The DMG beacon indicates that, for example, it is used for discovering by a STA when the discovery mode field is set to 1, and that also a 1×TRN (example: transmit training (TRN-T)) sequence attached in a physical (PHY) header. The TRN-T may be a plurality of sequences.

The DMG beacon implicitly or explicitly requests a probe response from an AP.

Next, the AP receives one or more directional-transmission DMG beacons and one or more TRN-T sequences respectively attached thereto and recognizes that one or more TRN-T sequences are to be used in quasi-omni transmissions.

Next, in a DTI, the AP transmits probe responses, for example, via a plurality of quasi-omni transmissions.

The STA receives the probe responses. When the STA responds with an ACK, the AP receives the ACK.

This allows beamforming training (TRN) sequences to be attached to a plurality of DMG beacons directionally transmitted in the BTI, even when collision or conflict occurs in an A-BFT.

The transmission of the TRN sequences can also be fragmented across a plurality of BTIs, that is, the TRN sequences can also be transmitted in a BTI following a DTI.

A DMG beacon to which quasi-omni transmission of a TRN sequence is attached and that is to be directionally transmitted does not necessarily have to explicitly indicate that quasi-omni transmission is used for the TRN sequence.

Also, the STA can request a probe response from a peer device by using the DMG beacon to which quasi-omni transmission of the TRN sequence is attached and that is to be directionally transmitted.

As a result of the foregoing, a device in the range of quasi-omni transmission using the control MCS can be discovered at high speed and with high priority.

When the quasi-omni transmission is included in the BTI, a peer device can recognize whether or not discovery of a device/connection with a device is to be executed.

When discovery information is included in quasi-omni transmission in the BTI, the AP can discover the device (STA) with minimum overhead.

Third Embodiment

In a third embodiment, a description will be given of transmission of a DMG beacon via quasi-omni transmission by an AP in a BTI.

Figure 8:
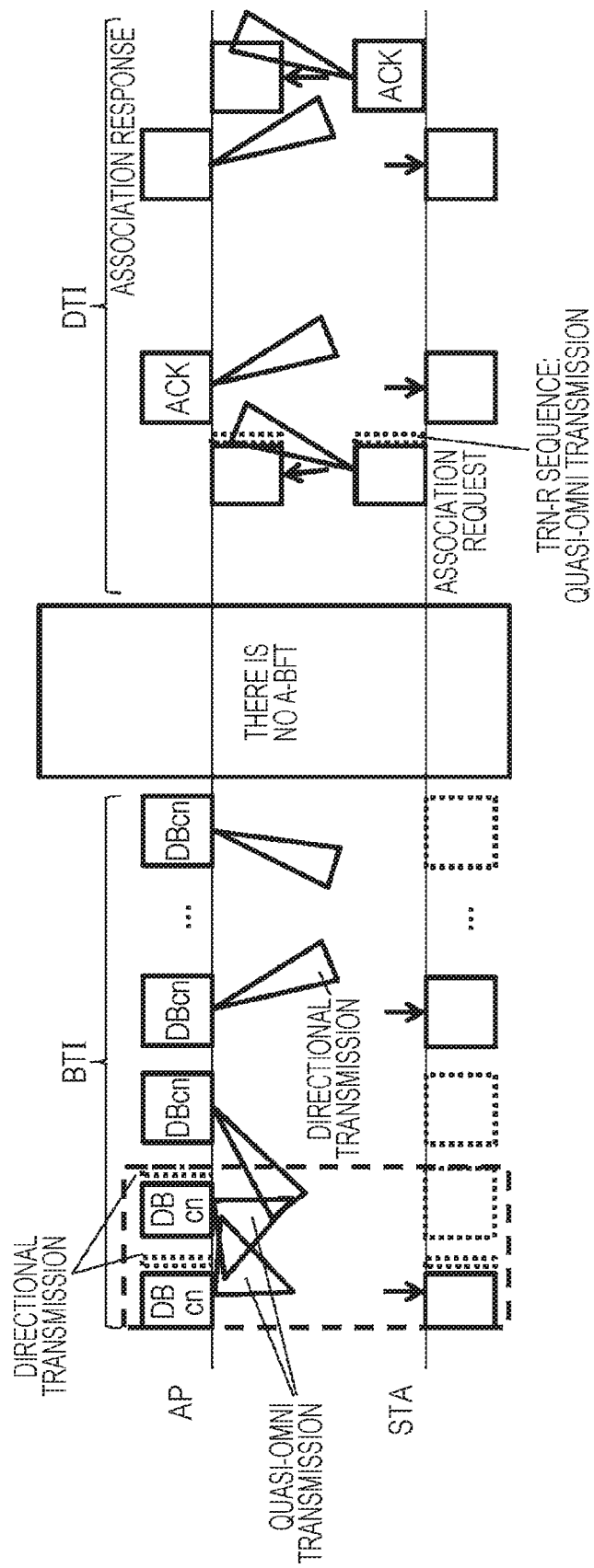
FIG. 8 is a diagram illustrating another example of the device discovery procedure using DMG beacons via quasi-omni transmission according to a third embodiment of the present disclosure.

FIG. 8 is a diagram illustrating another example of the device discovery procedure using DMG beacons via quasi-omni transmission.

An AP includes one or more quasi-omni transmissions for DMG beacons in a BTI. By using 1 bit of each DMG beacon, the DMG beacon indicates whether or not quasi-omni transmission is included in the BTI. By using 1 bit of each DMG beacon, the DMG beacon may indicate whether or not a frame is a quasi-omni transmission. A transmit sector of the quasi-omni transmission of each DMG beacon may differ for each transmission.

Figure 9:
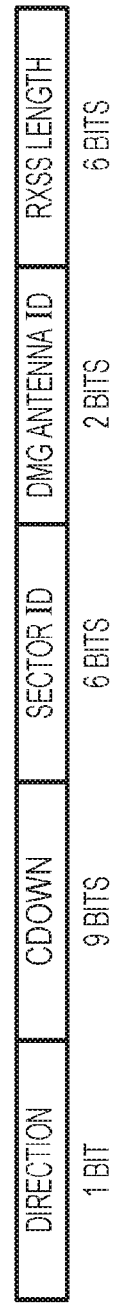
FIG. 9 is a diagram illustrating one example of a format of an SSW field (DMG beacon: DBcn) according to the third embodiment of the present disclosure.

FIG. 9 is a diagram illustrating one example of a format of an SSW field. One bit of a quasi-omni transmission DMG beacon, for example, 3 bits of an RXSS length field (reserved in a BTI), is used to indicate a plurality of quasi-omni transmissions. The SSW field can also be used as one constituent element of a DMG beacon in a BTI and can also be used as one constituent element of an SSW frame in an A-BFT.

The quasi-omni transmission DMG beacon is transmitted at the beginning of a BTI and includes an SSID, a DMG capability, and other information for prompt discovery, and a TRN-R sequence used for mutual antenna training is attached to the quasi-omni transmission DMG beacon. The TRN-R sequence is, for example, directionally transmitted in a range of quasi-omni transmission.

In order to reduce the duration of the BTI, the SSID, the DMG capability, and the other information may be omitted in a directional-transmission DMG beacon transmitted at a stage subsequent to the quasi-omni transmission DMG beacon.

Next, the STA receives DMG beacons, which are one or more quasi-omni transmissions and one or more directional transmissions, identifies a best receive sector from reception of a TRN-R sequence directionally transmitted in the range of the quasi-omni transmissions, and stores the best receive sector. The STA identifies a best transmit sector from the best receive sector, based on an antenna reciprocity, and stores the best transmit sector.

The STA reports discovery information to, for example, an upper layer or connection management software, such as Supplicant, and receives a connection command for an AP/PCP from the upper layer, the connection management software, or a user.

Next, in a DTI, by performing directional transmission, the STA connects, to the AP, an association request to which a TRN-R sequence is attached. The STA performs quasi-omni transmission on the TRN-R sequence.

The AP receives the association request via quasi-omni reception, identifies a best receive sector from reception of the TRN-R sequence, and stores the best receive sector. Based on the antenna reciprocity, the AP identifies a best transmit sector from the best receive sector, and stores the best transmit sector.

The AP directionally transmits an ACK in response to the association request from the STA and then responds to the request from the STA by transmitting an association response.

The STA receives the ACK and the association response that correspond to the association request and responds with an ACK in response to the association response from the AP.

When the AP receives the ACK that corresponds to the association response, the STA and the AP complete connection establishment.

As a result of the foregoing, quasi-omni transmission can be performed on a DMG beacon frame, or a beamforming training (TRN) sequence to be directionally transmitted can be attached to a DMG beacon frame.

A TRN sequence to be directionally transmitted for mutual antenna training may be attached to quasi-omni transmission of a DMG beacon in a BTI.

Also, when the position of a quasi-omni transmission is fixed (example: the beginning of a BTI), explicit instruction information does not necessarily have to be included.

For example, when the A-BFT is omitted, additional information used for discovering a device can be included in a quasi-omni transmission.

A DMG beacon quasi-omni transmission including the additional information can be transmitted at the beginning of the BTI. This allows, for example, a legacy device to analyze the additional information.

The device (STA) can use a frame to be transmitted as a link establishment frame (example: an association request).

As a result of the foregoing, a device in the range of quasi-omni transmission using the control MCS can be discovered at high speed and with high priority.

When quasi-omni transmission is included in the BTI, the peer device (AP) can recognize whether or not discovery of a device/connection with a device is to be executed.

When discovery information is included in the quasi-omni transmission in the BTI, the peer device (AP) can discover the device (STA) with minimum overhead.

By using the quasi-omni transmission and the directional TRN sequence, the peer device can reduce the beamforming time, since the A-BFT can be omitted.

The device can give priority to discovery of a peer device/response to a peer device, when the peer device uses a plurality of quasi-omni transmissions.

Although, in each embodiment described above, the present disclosure has been described in conjunction with an example in which it is configured using hardware, the present disclosure can also be realized by software in cooperation with hardware.

Also, the individual functional blocks used in the description of each embodiment described above are typically realized as a large-scale integrated (LSI) circuit. The integrated circuit may control the individual functional blocks used in the description of each embodiment described above and may have an input and an output. The functional blocks may be individually realized by single chips or may be realized by a single chip so as to include some or all of the functional blocks. Although the functional blocks are implemented by an LSI in this case, they may also be called an integrated circuit (IC), a system LSI, a super LSI, or an ultra LSI depending on a difference in the degree of integration.

The scheme for integrating the functional blocks into an integrated circuit is not limited to a scheme for LSI and may be realized using a dedicated circuit or a general-purpose processor. The scheme for the integration may also utilize a field programmable gate array (FPGA) that can be programmed after manufacture of an LSI or a reconfigurable processor that allows reconfiguration of connections or settings of circuit cells in an LSI.

In addition, when a technology for circuit integration that replaces LSI becomes available with the advancement of semiconductor technology or another derivative technology, such a technology may also naturally be used to integrate the functional blocks. Application of biotechnology or the like is possible.

Various aspects of the embodiments according to the present disclosure include the followings.

A wireless communication apparatus according to a first disclosure of the present disclosure includes: a frame configuration circuit that generates a transmission frame including directional multi-gigabit (DMG) beacons, wherein sector identifier fields in sector sweep fields included in the respective DMG beacons indicate one or more transmit sectors used for directional transmissions of the respective DMG beacons, and a field different from the sector identifier field included in each of the DMG beacons indicates whether or not there is quasi-omni transmission; and a transmission wireless circuit that performs, by using the transmit sector indicated by the sector identifier field, directional transmission on a first DMG beacon that is included in the DMG beacons and in which the field different from the sector identifier field indicates non-quasi-omni transmission and that performs quasi-omni transmission on a second DMG beacon that is included in the DMG beacons and in which the field different from the sector identifier field indicates quasi-omni transmission, in a beacon transmission interval.

The wireless communication apparatus according to a second disclosure of the present disclosure, including: a reception wireless circuit that receives, in a data transfer interval (DTI), a probe response transmitted via quasi-omni transmission and a sequence signal used for mutual antenna training from a communication partner to which the DMG beacons were transmitted; and a control circuit that selects, from the one or more transmit sectors, a transmit sector corresponding to a receive sector of the communication partner, the receive sector being indicated by the sequence signal.

In a wireless communication apparatus according to a third disclosure of the present disclosure, the frame configuration circuit generates an acknowledge (ACK) signal corresponding to the probe response; and the transmission wireless circuit performs directional transmission on the ACK signal by using the selected transmit sector.

A wireless communication method according to a first disclosure of the present disclosure including: generating a transmission frame including directional multi-gigabit (DMG) beacons, wherein sector identifier fields in sector sweep fields included in the respective DMG beacons indicate one or more transmit sectors used for directional transmissions of the respective DMG beacons, and a field different from the sector identifier field included in each of the DMG beacons indicates whether or not there is quasi-omni transmission; and performing, by using the transmit sector indicated by the sector identifier field, directional transmission on a first DMG beacon that is included in the DMG beacons and in which the field different from the sector identifier field indicates non-quasi-omni transmission, and performing quasi-omni transmission on a second DMG beacon that is included in the DMG beacons and in which the field different from the sector identifier field indicates quasi-omni transmission, in a beacon transmission interval.

The present disclosure is desirable for use in wireless communication apparatuses.

What is claimed is:

1. A communication apparatus comprising:
   reception circuitry which, in operation, receives a transmission frame including a plurality of directional multi-gigabit (DMG) beacons for transmission beam training and receives a Probe Request for device discovery before performing the transmission beam training, wherein the plurality of DMG beacons are transmitted as multiple directional transmissions and the Probe Request is transmitted with quasi-omni transmission from a communication partner apparatus; and
   transmission circuitry which, in operation, transmits a Probe Response via quasi-omni transmission in response to the Probe Request that is received before performing the transmission beam training.

2. The communication apparatus according to claim 1, wherein the reception circuitry, in operation, receives a frame via directional transmission after transmitting the Probe Response.

3. The communication apparatus according to claim 1, wherein the Probe Request is received after receiving the plurality of DMG beacons within a Beacon Transmission Interval (BTI).

4. The communication apparatus according to claim 1, wherein the reception circuitry, operation, receives an ACK frame transmitted via directional transmission from the communication partner apparatus, after the transmission circuitry transmits the Probe Response with a TRN-R sequence.

5. A communication method for a communication apparatus comprising:
   receiving a transmission frame including a plurality of DMG beacons for transmission beam training and receiving a Probe Request for device discovery before performing transmission beam training, wherein the plurality of DMG beacons are transmitted as multiple directional transmissions and the Probe Request is transmitted with quasi-omni transmission from a communication partner apparatus; and transmitting a Probe Response via the quasi-omni transmission in response to the Probe Request that is received before performing the transmission beam training.

6. The communication method according to claim 5, comprising:
   receiving a frame via directional transmission after transmitting the Probe Response.

7. The communication method according to claim 5, wherein the Probe Request is received after receiving the plurality of DMG beacons within a Beacon Transmission Interval (BTI).

8. The communication method according to claim 5, comprising:
   receiving an ACK frame transmitted via directional transmission from the communication partner apparatus, after transmitting the Probe Response with a TRN-R sequence.

\* \* \* \* \*